Figure 1:
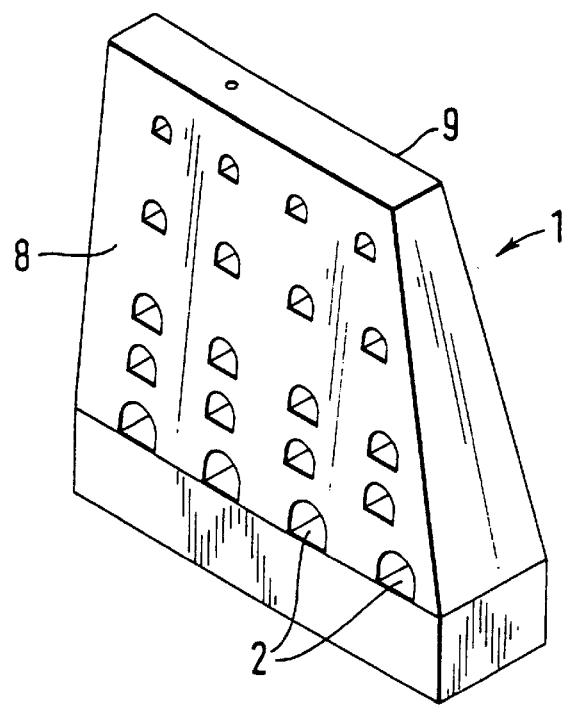

United States Patent

Jahren

[11] Patent Number: 5,860,392
[45] Date of Patent: Jan. 19, 1999

[54] ARTIFICIAL HABITAT FOR LOBSTER

[75] Inventor: Per Jahren, Hvalstad, Norway

[73] Assignee: P.J. Consult A/S, Hvalstad, Norway

[21] Appl. No.: 860,218

[22] PCT Filed: Dec. 18, 1995

[86] PCT No.: PCT/NO95/00235

§ 371 Date: Jun. 23, 1997

§ 102(e) Date: Jun. 23, 1997

[87] PCT Pub. No.: WO96/19107

PCT Pub. Date: Jun. 27, 1996

[30] Foreign Application Priority Data

Dec. 22, 1994 [NO] Norway ................................. 944977
Jun. 20, 1995 [NO] Norway ................................. 952470

[51] Int. Cl.⁶ ......................................................... A01K 61/00
[52] U.S. Cl. ........................................... 119/208; 119/221

[58] Field of Search ............................... 119/208, 209, 119/221, 238

[56] References Cited

U.S. PATENT DOCUMENTS 5,173,006  12/1992  Lowe ................................. 119/221 X
5,564,369  10/1996  Barber et al. ........................... 119/221

FOREIGN PATENT DOCUMENTS 6058933  12/1985  Japan ................................. 119/221
1398787  5/1988  U.S.S.R. ............................. 119/221

*Primary Examiner*—Robert P. Swiatek
*Attorney, Agent, or Firm*—Young & Thompson

[57] ABSTRACT

A lobster habitat includes one or more elements made of a sea water resistant material that are provided with recesses in their opposite largest surfaces which are intended to form hiding-places for lobster fry.

20 Claims, 3 Drawing Sheets

ARTIFICIAL HABITAT FOR LOBSTER

The invention concerns a lobster house or lobster habitat in water resistant materials consisting of one or more elements equipped with recesses of varying sizes of opening and depth, which can be through-going in the element, wherein the element is composed of a block of uniform thickness or a block which is thicker at one end.

In the field of marine biology it is known to deploy so-called fish houses on the seabed. This is due to the fact that fish and marine organisms have been observed to gather around shipwrecks on the seabed, oil installations and the like. Such structures have been shown to be well suited to attract stationary fish, i.e. fish which remain in the same area for their entire lives provided that the supply of food is adequate.

The present inventor has observed in Japan amongst other places that sub-merged fishing boats, exposed pipe structures and car tyres provide a good basis for marine growth and attract marine organisms, but it appears to be important for these structures to be stable. Submerged tyres which are moved by the current do not provide the same amount of marine growth as, e.g., a stationary and stable wreck.

Lobsters are a stationary crustacean. However, they are cannibalistic and dependent on natural hiding-places in order to attain full growth. These hiding-places must provide adequate protection while at the same time giving access to volumes of water which are regularly replaced, thus providing satisfactory supplies of food.

The hiding-places may, e.g., be hollows or recesses in soft species of rock, coral reefs or loose stones. These rocks will be capable of providing overhang and hiding-places while at the same time the current of water supplies food. The result of this therefore is that there are large areas along the coast which are not suitable for lobsters even though the food supply may be adequate.

Structures in which lobsters are accommodated are known from Japan amongst other places. These consist of compact pyramidal structures of concrete with a plurality of openings in the external surfaces. However, these structures have many drawbacks. The compact construction makes deployment on the seabed complicated due to the great weight. They have small surfaces in relation to the volume of the structure, which results in a relatively small number of hiding-places and less satisfactory economic exploitation. Moreover, uniform openings will not take account of the fact that the lobster grows during its development and needs more room for protection within the same area.

Thus it is an object of the present invention to provide a lobster habitat or lobster house which ensures that the lobster is protected during its entire growth period, and where the openings in the hiding-place are exposed to adequate supplies of food when the volumes of water are replaced. In addition the material must be of a type which provides optimum marine growth. The surfaces must be large in relation to the volume and the weight/construction should make deployment uncomplicated with present day technology, in addition to which the deployed structures should also be stable.

These objects are achieved by the present invention characterized by the features presented in the claims.

On the basis of the above information, it is important for the lobster habitat to consist of one or more large surfaces with recesses perpendicular to the surface, with varying depth and shape of the openings which must be of different sizes in order to give shelter to the lobsters at various stages of their growth and where this lobster habitat can be designed in such a manner that the surfaces are exposed to replacement of the volumes of water. At the same time the structure should be simple to deploy on the seabed with existing maritime technology and once it has been deployed it should be capable of establishing a stable structure on the seabed with is not moved by the currents.

The present invention is therefore composed of one or more elements of water resistant material wherein the element consists of a block of uniform or varying thickness provided with holes on both of the two largest opposite surfaces, the main surfaces, of the same or different depths or through-going holes, in which the circumference of the holes on the element's main surfaces may have any suitable shape and different sizes. Since the elements have to be placed preferably on their edges on the seabed, they can be designed with the greatest thickness at the end which is intended to form the base, thus concentrating most of the weight here, while at the same time the holes on each side of the thicker part can be deeper than the holes which are formed in the blocks higher up towards what will constitute the top of the element when it is deployed.

Several elements of this kind, preferably 3–6, most preferably 3, can be connected together to form a star-shaped structure which will provide large surfaces and small volume, with holes or recesses of varying size. This shape will be capable of creating turbulent water movement and thereby providing adequate quantities of nutrient organisms.

The invention will now be described in more detail with reference to the figures, in which FIG. 1 is a perspective view of a lobster habitat element 1 according to the invention with recesses 2 which have larger openings and are deeper towards the base of the element which is also thicker at this end.

Figure 2:
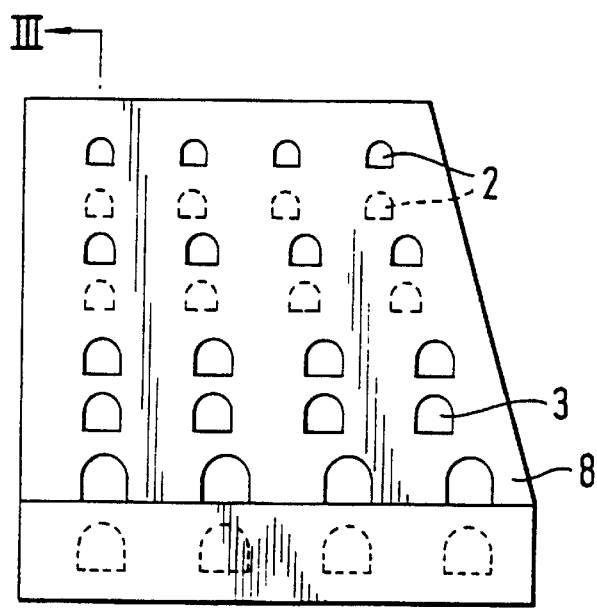
Figure 3:
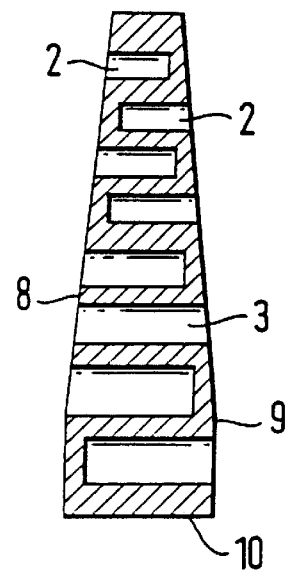

FIG. 2 is a plan view of one of the surfaces of the element in which the openings 2 in the opposite plane are illustrated displaced in relation to the plane's openings. One set of openings 3 is through-going FIG. 3 is a section through line III—III in FIG. 2 and demonstrates that the recesses nearest the base are deeper than those higher up, a through-going row of holes 3, in addition to which the trapezoidal appearance of the cross section is demonstrated.

Figure 4:
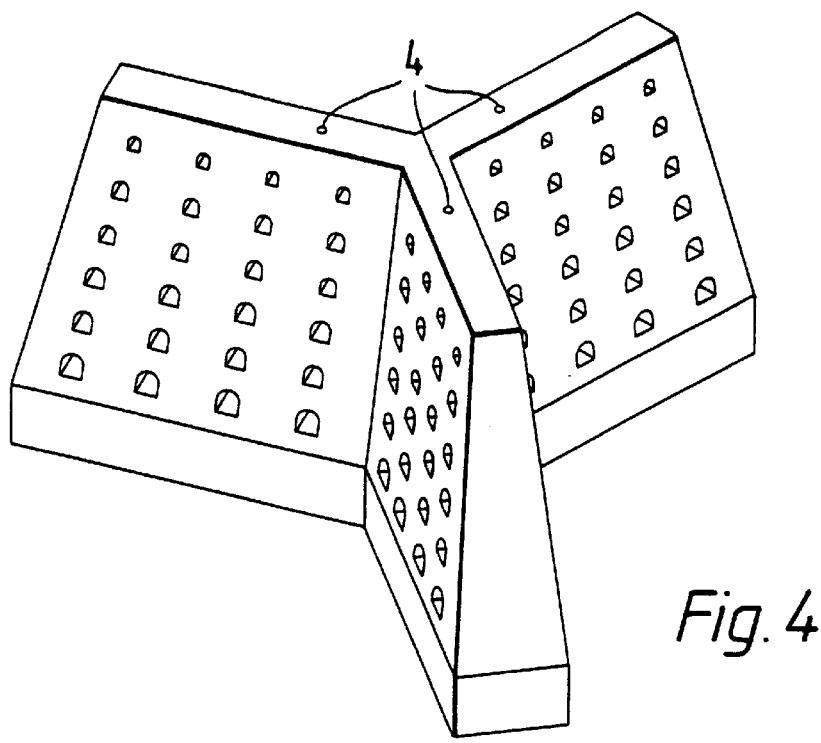

FIG. 4 illustrates an embodiment of the invention in which three elements are connected together in the form of a star in which the base of each element is thicker than the top of the element. Hole 4 indicates lifting arrangements which are used when deploying the structure.

Figure 5:
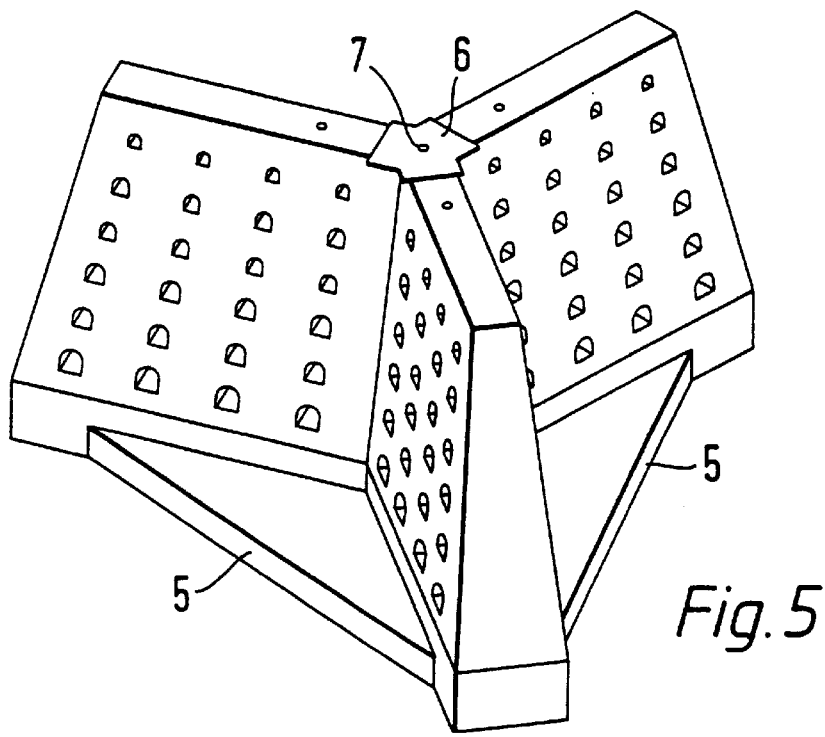

FIG. 5 illustrates the structure as in FIG. 4, but here the elements are cast individually and connected together by means of a bottom plate 5, top bracket 6 and safety bolt 7.

Figure 6:
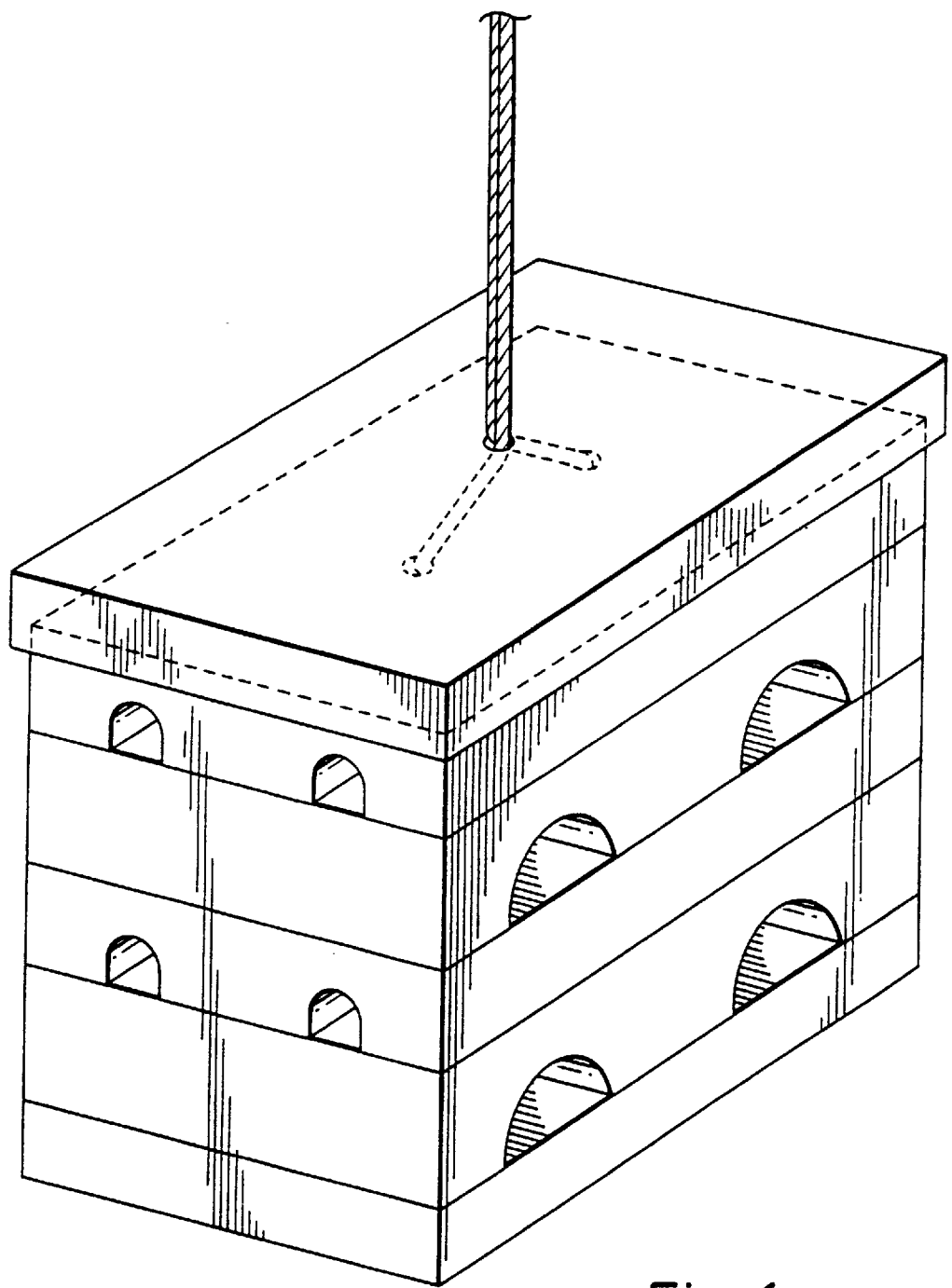

FIG. 6 illustrates an embodiment of the invention wherein the elements which in this case are of uniform thickness are connected in order to form a mooring.

The individual element according to the invention (FIGS. 1,2 and 3) can be in the form of a block 1 (FIG. 1) of water resistant material with two opposite surfaces, the main surfaces, 8,9, where the block is thickest at the end which will be the base when it is placed on its edge, the cross section of the two main surfaces thus having a trapezoidal shape (FIG. 3). This shape permits deeper holes 2 to be placed at the base while at the same time stabilizing the element on the seabed, since the base becomes heavier than the top.

Each of the main surfaces 8,9 is provided with openings 2,3 of any shape and size whatever and with recesses inside the element, or recesses 3 which pass right through the element. These are, e.g., arranged in rows (FIGS. 1,2), but can also be randomly arranged over the whole element in such a manner that the largest openings with the deepest recesses are located in the element's thickest end (FIG. 3). The different sizes of the holes mean that they can house lobsters of different sizes, and at different stages of development. In a second embodiment the element or plate has uniform thickness with holes 2,3 of varying shape and depth on both surfaces, displaced in relation to each other in the same way as that illustrated in FIGS. 1–3. This embodiment of the element is not illustrated.

The elements are made of a heavy, water resistant material, e.g. concrete. Experience has been built up over a long period of time with concrete structures in water, such as salt water. In the construction of artificial habitats for marine organisms concrete is advantageous since;

the material on the surface consists of Si and Ca ions which are the main component of natural bottom materials, the food chain is not polluted, the weight of the material creates favourable conditions for stability.

In order to augment the stability and weight in the thick part of the block the upper part can be cast in light aggregate concrete. The use of a combination of light aggregate concrete at the top and normal concrete towards the base provides an optimum construction since it gives maximum marine growth, the weight is reduced and the stability is ensured.

When deploying the structure it is important that all the surfaces should be exposed to water in movement and a large number of structures should be deployed at a good distance from one another in order to provide an adequate supply of food to all the lobsters which settle in the habitat. The elements can be situated individually, but this is usually less suitable for cost-benefit reasons.

A structure in which the weight is low enough for deployment to be undertaken without problems, and the surfaces exposed to the surrounding water are large in relation to the volume of the structure is illustrated by the embodiments in FIG. 4 and FIG. 5. A star-shaped structure of this kind can comprise from 3–6 individual elements, preferably 3. Such a shape will provide turbulence in the water in movement and help to ensure that the turbulent volumes of water carry food with them and supply this food to all the openings in the exposed surfaces.

The design according to the invention illustrated in FIG. 4 is cast as a whole and requires larger transport and crane equipment. In FIG. 5 a design is illustrated where the individual elements are driven up to the wharf and connected together on a bottom plate 5 with top bracket 6 and safety bolt 7. The bottom plate 5, top bracket 6 and safety bolt 7 can be made of any suitable material which is water resistant and which can withstand the stresses involved.

In a further embodiment the elements or blocks, which are now of a uniform thickness, are assembled to form a mooring (FIG. 6) which combines great weight with the possibility of providing the right conditions for the growth of lobsters. This structure will be constructed of normal concrete alone, or a combination of normal concrete and light aggregate concrete, with the latter in the top part of the mooring. This design will be suitable for attaching to wharfs and buoys for use by private house and cabin owners while at the same time providing optimum conditions for the growth of marine organisms, such as crustacea.

I claim:

1. An artificial habitat for lobsters comprising:

at least one solid block of water resistant material having two opposite generally vertically ascending main surfaces and two opposite side surfaces, each of said main surfaces being larger than each of said side surfaces, said main surfaces being farther apart at a bottom of the habitat that is adapted to rest on a seabed when the habitat is operating than at a top of the habitat, each of said main surfaces having plural lobster habitat openings therein that extend generally horizontally into said at least one solid block, said openings having plural sizes and depths to accommodate lobsters of plural sizes.

2. The habitat of claim 1, further comprising a bottom section adapted to rest on a seabed when the habitat is operating, said bottom section comprising a parallelepiped slab of water resistant material.

3. The habitat of claim 1, wherein said water resistant material is concrete.

4. The habitat of claim 1, wherein the bottom of the habitat comprises a water resistant material of a first density and the top of the habitat comprises a water resistant material of a second density less than said first density.

5. The habitat of claim 1, further comprising plural ones of said at least one solid block connected at respective said side surfaces.

6. The habitat of claim 5, comprising three solid blocks connected in a Y-shape.

7. The habitat of claim 5, further comprising a bottom plate connecting said solid blocks at respective main surfaces adjacent one end of the habitat.

8. The habitat of claim 1, further comprising a boat mooring connection at one end of the habitat.

9. The habitat of claim 1, wherein ones of said openings on one of said main surfaces are displaced in relation to others of said openings on the other of said main surfaces.

10. An artificial habitat for lobsters comprising:

at least one concrete block having two opposite main surfaces and two opposite side surfaces, each of said main surfaces being larger than each of said side surfaces, each of said main surfaces having plural lobster habitat openings therein that extend into said at least one block, said openings having plural sizes and depths to accommodate lobsters of plural sizes, wherein a first end of said at least one block adapted to rest on a seabed when the habitat is operating comprises concrete of a first density and an opposite end of said at least one block comprises concrete of a second density less than said first density.

11. The habitat of claim 10, comprising three concrete blocks connected at respective said side surfaces in a Y-shape.

12. The habitat of claim 11, wherein said first end of each of said blocks comprises a parallelepiped slab of concrete having said first density.

13. The habitat of claim 12, further comprising at least one bottom plate for connecting said slabs of said three blocks to each other.

14. The habitat of claim 10 wherein each of said openings has a longitudinal depth into said at least one block that is larger than its maximum lateral extent, and wherein the maximum lateral extent of ones of said openings at one end of said at least one block adapted to rest on a seabed when the habitat is operating are larger than the maximum lateral extent of ones of said openings at an opposite end of said at least one block.

15. The habitat of claim 10, wherein plural ones of said openings extend from one of said main surfaces to the other of said main surfaces.

16. An artificial habitat for lobsters comprising:

at least one solid block of water resistant material having two opposite main surfaces and two opposite side surfaces, each of said main surfaces being larger than each of said side surfaces, each of said main surfaces having plural lobster habitat openings therein that extend into said at least one solid block, said openings having plural sizes and depths to accommodate lobsters of plural sizes, wherein ones of said openings on one of said main surfaces are displaced in relation to others of said openings on the other of said main surfaces.

17. The habitat of claim 16, wherein said openings are semicircular at said main surfaces and have flat floors.

18. The habitat of claim 16, wherein each of said openings has a longitudinal depth into said at least one block that is larger than its maximum lateral extent.

19. The habitat of claim 18, wherein the depths of ones of said openings at one end of said at least one block adapted to rest on a seabed when the habitat is operating are deeper than the depths of ones of said openings at an opposite end of said block.

20. The habitat of claim 16, wherein one end of said at least one block adapted to rest on a seabed when the habitat is operating comprises a water resistant material of a first density and another end of said at least one block comprises a water resistant material of a second density less than said first density.

* * * * *